(12) United States Patent
Croydon et al.

(10) Patent No.: US 6,388,250 B1
(45) Date of Patent: May 14, 2002

(54) PERSONAL RADIATION DOSIMETERS

(75) Inventors: William Frederick Croydon, Ower Romsey; Robert James Heath, Corfe Mullen Wimbourne; Stewart Melville Bowen, Poole Dorset, all of (GB)

(73) Assignees: Siemens Plc, Berkshire (GB); Chiyoda Technol Corporation, Tokyo (JP)

( * ) Notice: Subject to any disclaimer, the term of this patent is extended or adjusted under 35 U.S.C. 154(b) by 0 days.

(21) Appl. No.: 09/132,505

(22) Filed: Aug. 11, 1998

(30) Foreign Application Priority Data

Aug. 9, 1997 (GB) ............................................. 9716809

(51) Int. Cl.[7] ............................. G01T 1/02; G01T 1/14
(52) U.S. Cl. ............................. 250/252.1; 250/370.07
(58) Field of Search ........................ 250/370.07, 370.01, 250/484.4, 252.1, 484.5

(56) References Cited

U.S. PATENT DOCUMENTS

| 4,405,234 | A | * | 9/1983 | Juaire ........................... 356/239 |
| 5,117,113 | A | * | 5/1992 | Thomson et al. ......... 250/370.07 |
| 5,132,543 | A | * | 7/1992 | Valentine et al. ........... 250/388 |
| 5,206,513 | A | * | 4/1993 | Valentine et al. ........... 250/374 |
| 5,567,936 | A | * | 10/1996 | Basso ...................... 250/252.1 |
| 5,606,163 | A | * | 2/1997 | Huston et al. ............... 250/337 |
| 5,739,541 | A | * | 4/1998 | Kahilainen ............. 250/370.07 |
| 6,087,656 | A | * | 7/2000 | Kimmich et al. ........ 250/252.1 |
| 2001/0032933 | A1 | * | 10/2001 | Thomson et al. ...... 250/370.01 |

FOREIGN PATENT DOCUMENTS

| EP | 0 209 351 | 1/1987 |
| GB | 857 762 | 1/1961 |
| GB | 2 115 549 A | 9/1983 |
| GB | 2 254 692 | 10/1992 |

\* cited by examiner

*Primary Examiner*—Constantine Hannaher
*Assistant Examiner*—Albert Gagliardi
(74) *Attorney, Agent, or Firm*—Crowell & Moring LLP

(57) ABSTRACT

A personal radiation dosemeter comprising a radiation detector means coupled to an electronic measurement circuit arranged in combination therewith to generate signals representative of an amount of radiation detected by the radiation detector. The radiation detector means is arranged to be screened from ambient light and is further provided with a light source optically coupled to the radiation detector and arranged to operate under control of a test control circuit to generate light of a wavelength which may be detected by said radiation detector. This arrangement provides, in combination with said electronic measurement circuit an integrity test for said radiation detector means.

20 Claims, 2 Drawing Sheets

PERSONAL RADIATION DOSIMETERS

Figure 1:
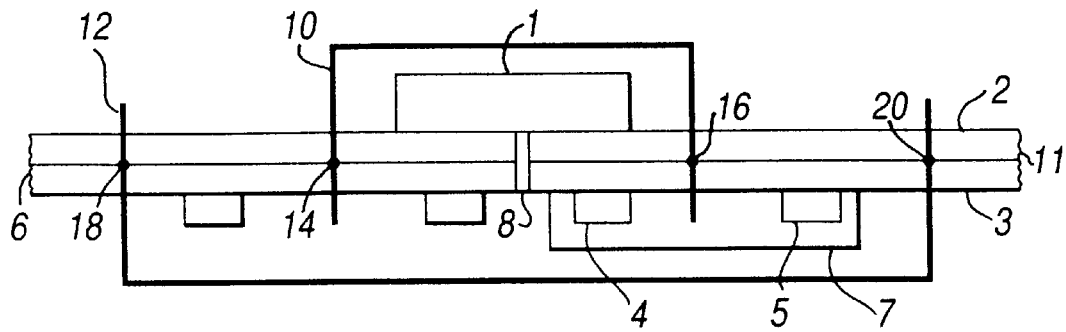

The present invention relates to personal radiation dosemeters or indicators which operate to measure radioactivity doses to which personnel are exposed.

Electronic personal dosemeters are worn by personnel in potentially hazardous environments. An example of such an environment is a nuclear power station where there is the possibility, however small, of personnel receiving radiation doses which may be potentially hazardous to their health. For this reason, personnel are often required to carry or wear an electronic personal dosemeter which operates to detect radiation and provide an indication of an amount of radiation to which the personnel are exposed at any time.

Electronic personal dosemeters are provided with radiation detectors which operate to generate a signal for each particle of radiation detected. Electronic personal dosemeters may furthermore provided with a means for converting signals generated or detected by the radiation detector into an audio signal so that a person wearing the dosemeter is given an audible indication of a current level of radiation to which their body is being exposed.

Typically, during a day's activity, a person working in a power station may be in an environment where there are relatively large amounts of radiation during one part of the day, and in an environment in which there is virtually no radiation, or only background radiation present, in another part of the day. As such, a technical problem exists in that, if the electronic personal detector worn by a person should malfunction at a time when the person is in an environment where there is no radiation, then the person wearing the detector will not be alerted to the presence of harmful amounts of radiation as a result of the malfunction of the dosemeter. A technical problem therefore exists in arranging for the radiation dosemeter to be tested in a way which provides regular confirmation of the integrity of the radiation dose-meter.

The technical problem of testing and confirming the integrity of a radiation dosemeter is addressed by the present invention.

According to the present invention, there is provided a personal radiation dosemeter comprising a radiation detector means coupled to an electronic measurement circuit arranged in combination therewith to generate signals representative of an amount of radiation detected by said radiation detector, wherein said radiation detector means is provided with a light source optically coupled to said radiation detector and arranged to operate under control of a test control circuit to generate light of a wavelength which may be detected by said radiation detector, thereby providing in combination with said electronic measurement circuit an integrity test for said radiation detector means.

The term light as used herein refers to light in both the visible and invisible spectra.

By arranging for the electronic personal dosemeter to be provided with a light source capable of generating photons in the visible or infra-red spectra, and arranging for the test control circuit to generate or energise the light source at predetermined intervals, the electronic personal dosemeter is provided with a means for testing the integrity of the radiation detector and the electronic circuit means thereby confirming the integrity of the radiation dosemeter.

The light source may be a light emitting diode. The optical coupling may include a fibre optic. The optical coupling may be effected from reflection from a surface of the shield.

A further problem with known electronic personal dosemeters is that he radiation detectors are susceptible of providing false readings as a result of electromagnetic interference. For example, stray electromagnetic fields generated by computer monitors, radar systems or mobile phones may cause a false reading of a radiation particle to be detected.

The radiation detector should also be provided with a screen or shield from certain low energy X-rays or gamma photons in order to filter such low energy X-rays or gamma photons in order to provide a better representation of radiation received by the human body. To this end, the radiation detector must be provided with a radiological shield as well as a shield from electromagnetic interference. A technical problem therefore exists in providing a personal radiation dosemeter with a shield from both electromagnetic interference and a radiological shield. This technical problem is addressed by a first aspect of the present invention.

According to a first aspect of the invention there is provided a personal radiation dosemeter comprising a radiation detector means coupled to an electronic measurement circuit and arranged in combination to generate signals representative of an amount of radiation received by said radiation detector means, wherein there is further provided a shield arranged to be electrically coupled to an earth plane and to substantially surround a volume in which said radiation detector means is disposed, said shield being fabricated from electrically conductive material so as to provide substantial electromagnetic screening and said electrically conductive material has a composition and density which is sufficiently high to provide substantial radiological shielding for substantially low energy radiation particles, said shield being thereby arranged to provide both electromagnetic and radiological screening.

The electrically conductive material may be a metal. The metal may be tin. The metal may be an alloy such as pewter.

By fabricating a shield which provides both radiological and electromagnetic screening to the radiation detector, a reduction in size and weight of the radiation dosemeter may be effected. This is particularly advantageous for personal dosemeters.

Known radiation dosemeters are arranged to provide an audible signal for an integral number of particles of radiation detected by a radiation detector. However, there is a requirement to provide instruments to detect radiation, with different characteristics. This requires the use of more than one detector, each of which is arranged to detect radiation with different characteristics. A technical problem therefore exists in providing an audible signal which is representative of the radiation dose rate received by the human body without dependence upon the characteristics of the radiation detector.

Known radiation dose rate meters use a microprocessor to effect processing and combination of signals from a plurality of detectors. However, microprocessors consume a significant amount of power whilst in an operating mode and for this reason may be only activated on a basis of a duty cycle. The duty cycle has an effect that battery power is economised. However the duty cycle of the microprocessor is such that a maximum repetition frequency of the audio signal indicative of the radiation dose rate may be unacceptably low. These technical problems are addressed by a second aspect of the present invention.

According to a second aspect of the present invention there is provided a personal radiation dosemeter for generating a monitor signal representative of a radiation dose rate, said radiation dosemeter comprising a radiation detector means coupled to an electronic measurement circuit arranged in combination therewith to generate signals representative of an amount of radiation received by said radiation detector, wherein said electronic measurement circuit includes at least one data store, an accumulator means and control circuit means, which control circuit means is coupled to said radiation detector means and arranged to add a predetermined number stored in said data store to an accumulated total stored in said accumulator in response to signals from said radiation detector means, said control circuit being arranged to generate a monitor signal for each increment of said accumulated total by said predetermined numerical threshold, which monitor signal is fed to an audio signal generator so as to provide an audible signal in accordance with said increment, a repetition frequency of said audible signal being thereby representative of said radiation dose.

By arranging for a control circuit to add a predetermined number to an accumulator means when a signal is received from the radiation detector means, a scaling of the signal received or generated by the radiation detector means may be effected by appropriately selecting the number stored in the data store and the numerical threshold which is used to trigger the monitor signal when the numerical threshold is reached. In this way scaling of the signal generated by the radiation detector means is effected without a requirement for a microprocessor, thereby allowing the control circuit to be implemented in hardware thus effecting a substantial improvement in power consumption of the electronic personal dosemeter.

The personal dosemeter may further include at least one other radiation detector means and at least one other data store wherein said at least one other data store includes a further predetermined number and said control circuit operates to add said further predetermined number to said accumulator on consequent upon receipt of signals from said at least one other radiation detector means.

By providing a further radiation detector which may be arranged to detect a different type or energy of radiation particle and providing a further data store which is arranged to be pre-stored with a further predetermined number, the control circuit may be arranged to add said further predetermined number when said further radiation detector means detects the presence of radiation. In this way the accumulator maintains a total representative of an amount of radiation detected by said radiation detector means and said further radiation detector means in proportion to the first and further predetermined numbers. By selecting the first and the further predetermined numbers independence upon the numerical threshold, the radiation dosemeter may be arranged to generate a monitor signal at a repetition frequency which is arranged to provide an audible indication determined by the relative amounts and harmful effect of the radiation detected by the first and further radiation detector means.

Figure 2:
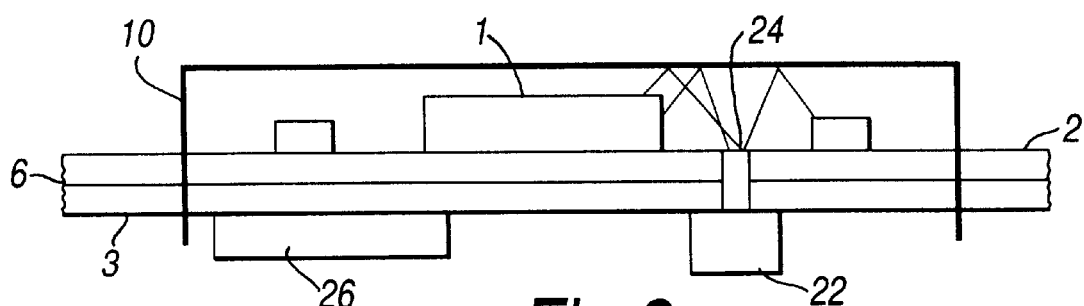
Figure 3:
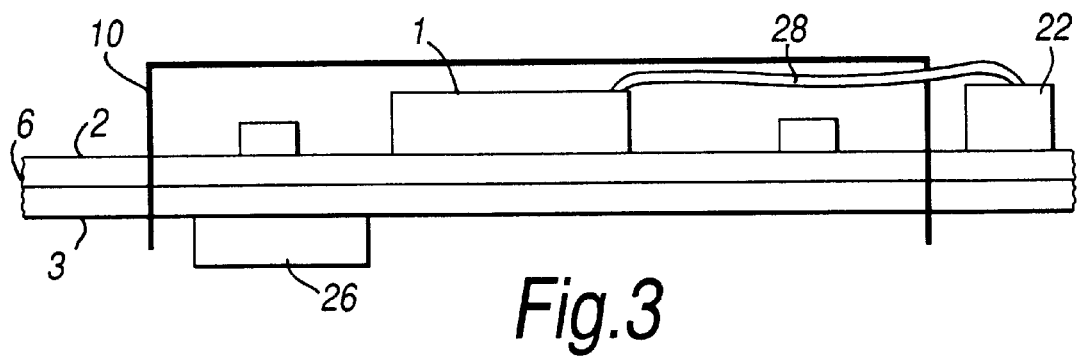
Figure 4:
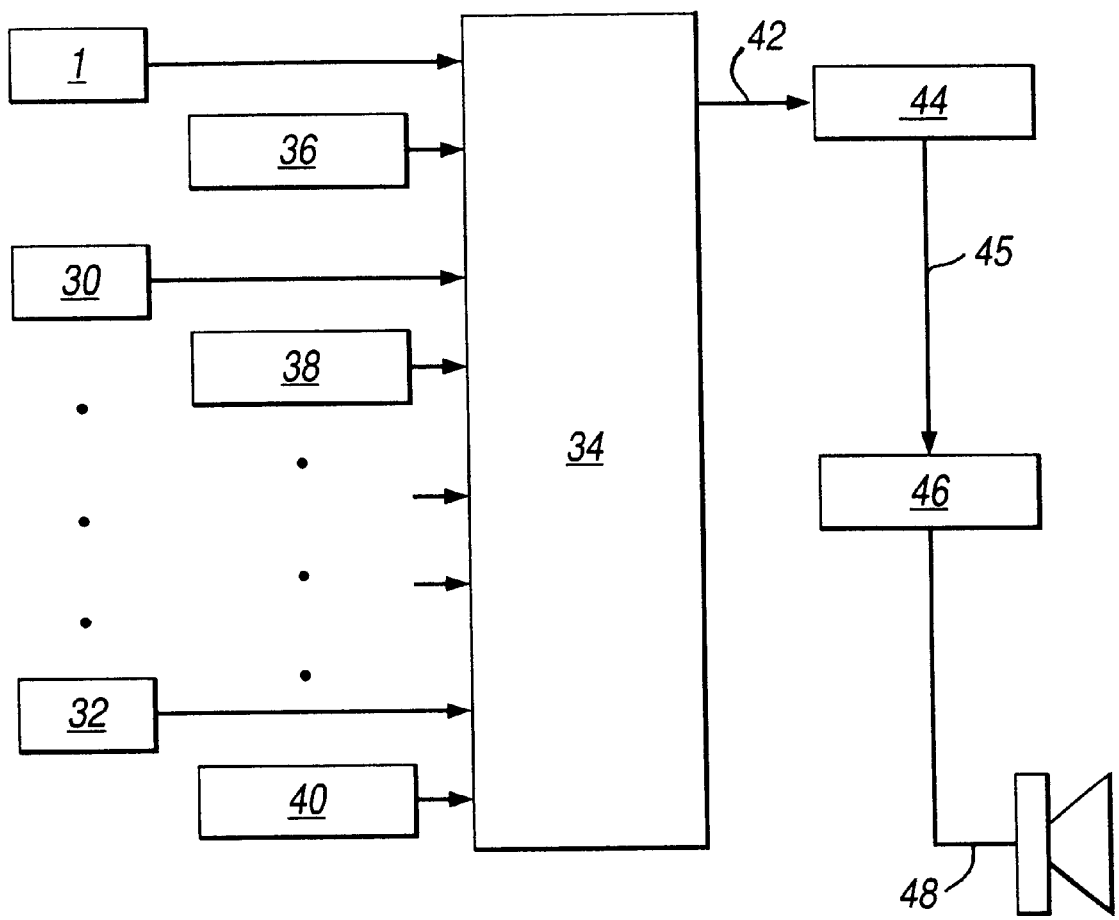

One embodiment of the present invention will now be described by way of example only with reference to the accompanying drawings wherein:

FIG. 1 is a schematic block diagram of a personal radiation dosemeter illustrating, in particular, a screen arrangement around the radiation meter, FIG. 2 is a schematic block diagram of part of the personal radiation meter shown in FIG. 1 illustrating operation of a means for testing the radiation detector shown in FIG. 1, FIG. 3 is a schematic block diagram of part of the personal radiation dosemeter shown in FIG. 1 showing a further arrangement for testing the radiation detector, and FIG. 4 is a schematic block diagram of an arrangement for generating an audible monitor signal in accordance with the detected radiation by the radiation detector means.

Part of an electronic radiation dosemeter is illustrated in a block diagram form shown in FIG. 1. In particular, FIG. 1 has been provided to illustrate an arrangement for forming a shield for the personal radiation dosemeter so as to provide protection from both electromagnetic interference and from low energy radiation particles.

In FIG. 1 a radiation detector 1, is shown to be disposed on a first plane 2 of a printed circuit board 11. On a second plane 3 of the printed circuit board, there is also shown further electronic components 4, 5, disposed upon the second plane 3. Interposed between the first and second planes 2 and 3 of the printed circuit boards, is a ground or earth plane 6, which is fabricated from a suitable material such that electrical conductivity is provided along its length. Also shown in FIG. 1 is an electrical via 8, for providing a means for electrically coupling the radiation detector 1, to components on the second plane 3 of the printed circuit board 11. As will be appreciated the printed circuit board 11 may be provided with a plurality of layers which may be electrically connected using conventional technology known to those skilled in the art Furthermore the physical arrangement of the electronic components 4, 5, within an enclosure provided by the shield may be different to that shown in FIG. 1, and many other arrangements may be envisaged.

In operation an electronic personal radiation dosemeter detects radioactive particles or high energy X-ray emissions using the radiation detector 1, which serves to generate a signal indicative of the presence of such a radiation particle. Such signals are thereafter fed to an electronic measurement circuit which is made up from components 4, 5, disposed on the printed circuit board 3. Since the radiation detector 1, is arranged to detect the presence of radiation particles and high energy photons, the radiation detector 1, must be shielded from other extraneous radiation such as electromagnetic interference or other electrical signals. This protection is further enhanced by disposing the earth or ground plane 6 Interposed between the first and second planes 2, 3 of the circuit board.

Electronic personal radiation dosemeters are arranged to provide an indication of an amount of radiation absorbed by the body. As such, it is necessary to provide the radiation detector 1 with an amount of shielding sufficient to attenuate low energy radiation particles or X-ray photons so that radiation detected by the radiation detector is a more accurate representation of a total amount of energy received by the human body. Hence it is necessary to provide a shield, known as a radiological shield, to prevent low energy radioactive particles from being detected by radiation detector 1. The shielding should be arranged to provide substantially 360° of shielding of the radiation detector 1.

As aforementioned, electronic radiation dosemeters are also sensitive to electromagnetic interference. Examples of sources of such electromagnetic interference are stray electromagnetic fields from monitors or from radar equipment which by its nature transmits high energy electromagnetic pulses, or from mobile telecommunications equipment providing interference at microwave frequencies. It is therefore necessary to provide both electromagnetic and radiological screening to an electronic radiation dosemeter. FIG. 1 provides an illustration of an arrangement of such a screen. In FIG. 1 a shield is provided in a first part 10, and a second part 12. The first part 10, is arranged to provide a screened volume around the radiation detector 1. The shield first part 10, is arranged to be electrically coupled to the earth plane 6, at a plurality of conveniently located fixing points. An example of such fig points is shown in FIG. 1 either side of shield first part 10 at points 14, 16.

The second part of the screen 12, is also electrically coupled to the earth plane 6, at points 18, 20. The second part of the shield 12, is arranged to provide a screened volume for the electronic components 4, 5, of the electronic measurement circuit 7, disposed on the second printed circuit board 3. By electrically connecting the first and second parts of the shield 10, 12, to the earth plane, the radiation detector and electronic components 4, 5, are provided with an electromagnetic shield in the form of a "Faraday cage". The first and second parts of the shield 10, 12, are arranged to provide substantially 360° of screening such that there is no line of sight for any radiation particles to the detector 1. As will be appreciated by the cogniscenti, the shield 10, 12, can also be fabricated in other arrangements.

By fabricating the first and second parts of the shield from a material which is both conductive and provides an appropriate attenuation of low energy radiation particles or low energy X-ray photons, the shield 10, 12, may provide radiological shielding as well as electromagnetic interference shielding. An example of such a material may be a metal such as tin. Tin may provide appropriate conductivity to effect electromagnetic interference shielding, whilst having an atomic number which is sufficiently high to attenuate low energy radiation particles before reaching the radiation detector 1. Another example of such a material is zinc. A further example is to use an alloy such as pewter which combines copper and tin so that appropriate levels of radiological shielding are effected whilst maintaining appropriate electromagnetic interference shielding. Pewter has the further advantage of being mechanically workable so that the first and second parts of the shield 10, 12, may be formed, and has a melting point which is higher than hat of conventional solder. As such, the shield 10, 12, may be suitably shaped and formed in components and soldered using standard circuit assembly techniques.

In use, electronic personal radiation dosemeters, are worn by personnel in potentially hazardous environments such as nuclear power stations. As such an amount of radiation detected by such a dosemeter will vary throughout daily use in accordance with an environment in which the personnel are present. For this reason, there may be periods during a day in which the personnel are exposed to little or no radiation. However, equally the personnel may be situated in environments where there are potentially hazardous levels of radiation. If a situation were to occur wherein the personal radiation dosemeter were to malfunction in an environment in which little or no radiation is present, then personnel may be subjected to hazardous levels of radiation without being alerted to this danger. To effect a remedy to undetected malfunctions of the personal radiation meter, a regular and frequent automatic self-test facility is provided. Although testing of the electronic measurement circuit may be effected using a known arrangement of coupling test signals into amplifiers and other electronic components of the measurement circuit, such test circuits would not provide a suitable test for the integrity of the radiation detector 1. An example of a radiation detector 1, is a photo sensitive detector which is arranged to detect ionising radiation. Such radiation detectors may also detect longer wavelength photons of light in the visible or infra-red spectra and it is for this reason that the radiation detector 1, must be screened from ambient light for correct operation.

An embodiment of the present invention illustrated in FIG. 2 shows a means for providing a test for the integrity of the radiation detector 1. FIG. 2 provides a schematic block diagram of part of the electronic personal radiation dosemeter shown in FIG. 1 where parts also appearing in FIG. 1 bear identical numerical designations. In FIG. 2 a light emitting diode 22, is disposed on the second plane 3 of the printed circuit board. In the first and second planes of the printed circuit board and the earth plane 6, there is provided a through hole 24, for communicating light generated by the light emitting diode 22, into the volume shielded by the first part of the shield 10. Also coupled to the light emitting diode 22, is a test circuit controller 26. The test circuit controller 26, is arranged to be as far as possible electrically isolated from other components of the electronic measurement circuit 7, such that there is no electrical coupling of signals from the test circuit controller 26, to the electronic measurement circuit 7.

In operation the test circuit controller 26, operates to control the light emitting diode 22, so as to provide a regular and frequent test of the integrity of the radiation detector 1 in combination with the electronic measurement circuit 7. The test circuit controller 26, operates to excite the light emitting diode 22, thereby generating photons of light which have a wavelength sufficient to cause detection of such photons by the radiation detector 1. The photons pass through the through hole 24 into the volume in which the radiation detector 1 is situated. Photons may reach the radiation detector indirectly via reflection from the inside surface of the first part of the shield 10. An alternative arrangement is illustrated in FIG. 3 where parts also appearing in FIGS. 1 and 2 bear identical numerical designations in FIG. 3 a fibre-optic 28, is provided to effect optical communication of photons generated by the light emitting diode 22, to the radiation detector 1. As will be appreciated by those skilled in the art, other means may be provided to effect optical coupling of the light generated by the light emitting diode 22 to the radiation detector 1.

Electronic personal radiation dosemeters are also provided with a means for providing an audible monitor signal which alerts the carrier of the personal radiation dosemeter to the presence of radiation. An example of such an arrangement is an audio signal generator coupled to the measurement circuit and arranged to generate an impulse of sound or 'chirp' in accordance with radiation detected by the radiation detector 1. In this way the frequency of the impulses or chirps is arranged to be in proportion with the current quantity of radiation detected by the radiation detector 1.

As is known to those skilled in the art, there are venous types of radiation particle. Each type of radiation particle may furthermore have a substantial range of energy. As such, different radiation detectors may be required to detect each of these types or energies of radiation. For this reason, the personal radiation dosemeter may be provided with a plurality of detectors, each of which is arranged to detect radiation particles with particular characteristics. The effect of a particle of radiation detected by the radiation detector for a low energy particle and radiation particle detected by the radiation detector for high energy particles are required to be scaled in accordance with difference in the harmful effects on the human body. After scaling, the personal radiation dosemeter must be arranged such that a repetition frequency of the audible monitoring signal is adjusted in accordance with the characteristics and quantity of radiation detected by each radiation detector.

A schematic block diagram of an arrangement which serves to generate such an audible monitoring signal is shown in FIG. 4. In FIG. 4 three radiation detectors 1, 30, 32 are shown to be connected to an audible monitor control circuit 34. Also connected to the audible monitor control circuit 34 are three data stores 36, 38 and 40. Connected to an output 42 of the audible monitor circuit controller 34 is an accumulator 44. Connected to an output of the accumulator 44, is an audible signal generator 46. Connected to an output of the audible signal generator 46, Is a loud speaker 48. The loud speaker 48, may for example be a piezo buzzer. Although the audible signal generator 46 shown in FIG. 4 has been illustrated with three radiation detectors 1, 30, 32, it will be readily appreciated by those skilled in the art that a number of radiation detectors may be provided, each of which is arranged to detect a predetermined or predefined type of radiation particle. Associated with each of the radiation detectors 1, 30, 32 is one of three data stores 36, 38, 40. Each of the data stores 36, 38, 40, is arranged to store a predetermined number representative of a typical dose delivered to the human body by a radiation particle detected by the corresponding radiation detector. In operation, the monitor circuit controller 34, operates to add the predetermined numbers stored in the data stores 36, 38, 40, into the accumulator 44, consequent upon receipt of a signals from the corresponding radiation detector 1, 30, 32, indicative of a detected particle of radiation. Thus, if for example radiation detector 1, detects a radiation particle, then the predetermined number stored in data store 36, is added to the running total in accumulator 44. When the accumulated total contained in accumulator 44, reaches a predefined numerical threshold, a signal is generated on conductor 45, representative of a predetermined amount of radiation energy received by the radiation detector. The signal fed on conductor 45, from accumulator 44, is received by the audible signal generator 46, which operates to generate a sound impulse or chirp fed to the loudspeaker 48, for audible conveyance of the detected quantity of radiation. The predefined numerical threshold in combination with the predetermined numerical values in the data stores 36, 38, 40 are arranged to generate a monitoring signal with a repetition frequency in proportion to the current dose rate from radiation particles received by the radiation dosemeter. Once the monitor signal has been generated, the running total in accumulator 44 is reduced by the predetermined numerical threshold, after which the aforementioned adding of the predetermined numbers to the accumulator 44, continues. One way of effecting this reduction is to set the aforementioned predetermined numbers so that the predefined numerical threshold is the maximum value of the accumulator. The monitor signal may then be generated from the accumulator 44, by simply an overflow indicator. However, as will be readily appreciated by those skilled in the art, other means may be used in order to effect the triggering of the monitor signal in accordance with a predetermined numerical threshold and corresponding re-setting of the accumulator 44.

The monitor circuit 34 may be implemented using hardware logic As such, a hardware implementation may provide a considerable improvement in economy of power, over a use of a microprocessor. Use of hardware to implement monitor circuit 34, instead of a microprocessor removes a limitation on a repetition frequency at which audible signals can be generated as a result of a microprocessor being powered up in accordance with a predetermined duty cycle. As a result of a hardware implementation, the monitor circuit 34, may be operated continuously in a power efficient manner thereby obviating any requirement for operation in accordance with a duty cycle, and so removing any limit on the repetition frequency of the audible signals.

As will be appreciated by those skilled in Me art, various modifications may be made to the embodiments hereinbefore described without departing from the scope of the present invention. In particular, various other forms of shield may be constructed whilst still providing the combined radiological and electromagnetic shielding effects provided by the present invention. Furthermore, other means may be provided for generating the photons of light used to test the radiation detector other than a light emitting diode. Other means may also be used for effecting operation of the audio monitor signal in accordance with accumulating predetermined numbers representative of an affect of radiation particles detected by a corresponding radiation detector.

What is claimed is:

1. A personal radiation dosimeter comprising:
 a radiation detector; and
 an electronic measurement circuit arranged coupled to said radiation detector for generating signals representative of an amount of radiation detected by said radiation detector;
 wherein said radiation detector includes
  a light source optically coupled to said radiation detector and arranged to operate under control of a test control circuit to generate light of a wavelength which may be detected by said radiation detector, thereby providing in combination with said electronic measurement circuit an integrity test for said radiation detector; and
  a screen which shields said radiation detector from ambient light.

2. A personal radiation dosimeter according to claim 1, wherein said a shield:
 provides substantially complete radiological and electromagnetic shielding of the radiation detector; and
 prevents low energy photons from reaching the radiation detector.

3. A personal radiation dosimeter according to claim 1, wherein the shield is
 electrically coupled to an earth plane and substantially surrounds a volume in which said radiation detector is disposed; and
 fabricated from electrically conductive material so as to provide substantial electromagnetic screening, which electrically conductive material has a composition and density sufficiently high to provide substantial radiological shielding, for substantially low energy radiation particles, said shield being thereby arranged to provide both electromagnetic and radiological screening.

4. A personal radiation dosimeter as claimed in claim 3, wherein said electrically conductive material is a metal.

5. A personal radiation dosimeter as claimed in claim 4, wherein the metal is tin.

6. A personal radiation dosimeter as claimed in claim 4, wherein said electrically conductive material is an alloy.

7. A personal radiation dosimeter as claimed in claim 6, wherein the alloy is pewter.

8. A personal radiation dosimeter as claimed in claim 3, wherein the control circuit operates said light source to provide a regular, frequent automatic self-test.

9. A personal radiation dosimeter as claimed in claim 1, wherein the light source is a light emitting diode.

10. A personal radiation dosimeter as claimed in claim 9, wherein the optical coupling includes an optical fiber arranged to convey the light to said radiation detector means.

11. A personal radiation dosimeter as claimed in claim 9, wherein the optical coupling is effected by reflection via a surface of the shield.

12. A personal radiation dosimeter as claimed in claim 1, wherein optical coupling of the light source to the radiation detector includes an optical fiber arranged to convey the light to said radiation detector means.

13. A personal radiation dosimeter as claimed in claim 1, wherein optical coupling of the light source to the radiation detector is effected by reflection via a surface of the shield.

14. A personal radiation dosimeter according to claim 1, wherein the control circuit operates said light source to provide a regular, frequent, automatic self-test.

15. A personal radiation dosimeter according to claim 1, wherein said electronic measurement circuit includes at least one data store, an accumulator means and a control circuit, which control circuit is coupled to said radiation detector and arranged to add a predetermined number stored in said data store to an accumulated total stored in said accumulator in response to signals from said radiation detector, said control circuit being arranged to generate a monitor signal for each increment of said accumulated total by said predetermined numerical threshold, which monitor signal is fed to an audio signal generator so as to provide an audible signal in accordance with said increment, a repetition frequency of said audible signal being thereby representative of said radiation dose rate.

16. A personal radiation dosimeter as claimed in claim 15, further comprising at least one other radiation detector and at least one other data store, wherein said at least one other data store includes a further predetermined number and said control circuit operates to add said further predetermined number to said accumulator consequent upon receipt of signals from said at least one other radiation detector.

17. A personal radiation dosimeter as claimed in claim 16, wherein said first and said further predetermined numbers are selected in combination with the numerical threshold, so that the radiation dosimeter generates a monitor signal at a frequency which provides an audible indication determined by the relative harm caused by the radiation detected by the first and further radiation detector means.

18. A personal radiation dosimeter as claimed in claim 16, wherein said predetermined numerical threshold is representative of a maximum count which is available to said accumulator, and said monitor signal is generated from an overflow signal generated by the accumulator.

19. A personal radiation dosimeter as claimed in claim 15, wherein said predetermined numerical threshold is representative of a maximum count which is available to said accumulator, and said monitor signal is generated from an overflow signal generated by the accumulator.

20. A personal radiation dosimeter as claimed in claim 15, wherein said predetermined numerical threshold is representative of a maximum count which is available to said accumulator, and said monitor signal is generated from an overflow signal generated by the accumulator.

\* \* \* \* \*